(12) United States Patent
Ogata et al.

(10) Patent No.: US 7,346,424 B2
(45) Date of Patent: Mar. 18, 2008

(54) MACHINING CONFIGURATION DRAWING APPARATUS AND MACHINING CONFIGURATION DRAWING METHOD

(75) Inventors: Toshiyuki Ogata, Yamanashi (JP); Koji Suzuki, Yamanashi (JP); Hiroyuki Abe, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 146 days.

(21) Appl. No.: 11/073,575

(22) Filed: Mar. 8, 2005

(65) Prior Publication Data

US 2005/0209728 A1   Sep. 22, 2005

(30) Foreign Application Priority Data

Mar. 16, 2004 (JP) .............................. 2004-074362

(51) Int. Cl.
*G06F 14/00* (2006.01)
(52) U.S. Cl. .................................. 700/184; 700/180
(58) Field of Classification Search ............... 700/162, 700/182, 184, 180; 345/667, 668
See application file for complete search history.

(56) References Cited

U.S. PATENT DOCUMENTS

| | | | | |
|---|---|---|---|---|
| 4,366,475 A | * | 12/1982 | Kishi et al. .................. | 345/668 |
| 4,961,072 A | * | 10/1990 | Sekikawa .................... | 345/671 |
| 5,144,212 A | * | 9/1992 | Izawa et al. ................. | 318/569 |
| 5,315,523 A | * | 5/1994 | Fujita et al. ................. | 700/180 |
| 5,359,530 A | | 10/1994 | Matsumura et al. | |
| 5,831,407 A | | 11/1998 | Ouchi et al. | |

FOREIGN PATENT DOCUMENTS

| | | | |
|---|---|---|---|
| EP | 0 121 100 | | 10/1984 |
| JP | 5-19837 A | | 1/1993 |
| JP | 05-053636 | * | 3/1993 |
| JP | 5-53636 A | | 3/1993 |
| JP | 5-080832 A | | 4/1993 |
| JP | 6-262436 | | 9/1994 |
| JP | 09-120308 | * | 5/1997 |
| JP | 9-120308 | | 5/1997 |
| JP | 2001-255916 | | 9/2001 |

OTHER PUBLICATIONS

Notice of Reasons for Rejection (Office Action) in corresponding Japanese Patent Application No. 2004-074362 dated Jul. 10, 2006.
Chinese Office Action issued in corresponding Chinese patent application 200510053884.8.
European Office Action issued Nov. 15, 2007 in corresponding European Patent Application No. 05251564.0-2206.

* cited by examiner

*Primary Examiner*—Kidest Bahta
*Assistant Examiner*—Steven R. Garland
(74) *Attorney, Agent, or Firm*—Staas & Halsey LLP

(57) ABSTRACT

A machining configuration drawing apparatus includes a drawing unit for drawing a machining configuration and a present machining position, a setting unit for setting a display area in an overall drawing area, a division unit for dividing the overall drawing area into a plurality of display areas based on the set display area, and a selection unit for selecting a drawing region drawn by the drawing unit from a plurality of drawing regions. The selection unit selects a drawing region in which the present machining position exists. Further, the drawing unit draws a machining configuration and a present machining position of the selected drawing region.

11 Claims, 13 Drawing Sheets

SETTING OF DISPLAY AREA

SETTING OF DISPLAY AREA

PRESENT MACHINING POSITION

AUTOMATIC UPDATE

PRESENT POSITION

DISPLAY AREA

PRESENT MACHINING POSITION

MACHINING CONFIGURATION DRAWING APPARATUS AND MACHINING CONFIGURATION DRAWING METHOD

BACKGROUND OF THE INVENTION

1. Field of the Invention

The present invention relates to drawing of a machining configuration, and more particularly, to a drawing apparatus for and a drawing method of displaying a machining configuration in an electric discharge machine.

2. Description of the Related Art

In wire electric discharge machines, a machining configuration is drawn on a screen to confirm the contents of a machining program and a present machining position.

When the machining configuration is displayed on the screen, a part of a machining path may be displayed thereon in enlargement to confirm the detailed configuration of a present machining position depending on a configuration and a size to be machined, in addition to the case where an overall machining configuration is displayed on the screen.

When a part of the machining path is displayed, the present machining position may run off the machining path on the screen on which the present machining position is displayed in enlargement as machining proceeds. In this case, a region in which the present machining position is displayed in enlargement must be set again and the present machining position must be displayed again. An operation for setting and displaying the enlarged display area again imposes a burden on an operator in addition to an operation for machining, due to which an operating efficiency is deteriorated.

It is contemplated to set an area to be displayed on the screen in a large size as a countermeasure for making the operation for an enlarged display unnecessary. When the dimension of the region to be displayed is increased, the number of times of enlarging and displaying the present machining position again can be reduced. However, since the resolution of display on the screen is lowered thereby, the present machining position and the machining configuration are displayed in a small size, which makes it difficult to confirm details.

Japanese Patent Application Laid-Open No. 06-262436 discloses a method of updating a display area to be drawn on a screen. According to the method, a portion from the leading end of an NC program to a work replacement code or a pallet replacement code included in the NC program or a portion from a previous work replacement code or a previous pallet replacement code included in the NC program to a next work replacement code or a next pallet replacement code is recognized as a portion. Then, an optimum scale value in each portion is calculated, and a movement locus is displayed according to the calculated scale value.

In the display area update method, a display magnification is changed by calculating a scale value each time a code set to the NC program is changed. Accordingly, even if the display magnification need not be changed because the amount of change of a machining position is small, a display is changed by the display magnification according to a scale value calculated again. Accordingly, a problem arises in that it is difficult to confirm a present machining position because the display magnification is changed frequently, in addition to a problem that an amount of calculation processing is increased.

Japanese Patent Application Laid-Open No. 09-120308 discloses another method of updating a display area to be drawn on a screen. In the method, a plurality of partial machining regions, which are to be displayed in enlargement, are previously set before a tool movement path begins to be drawn. After the tool movement path begins to be drawn, a partial machining region to which a tool position belongs is automatically switched and displayed on a screen in enlargement according to a tool moving position. The tool movement path is drawn in the partial machining area shown on the screen in enlargement. As a result, a plurality of previously set partial machining regions can be automatically drawn without manually switching them.

The display area update method is disadvantageous in that a setting workload is increased because the partial machining regions must be previously set. In particular, when a tool movement position is changed complexly, and when a tool moving path is long, the setting workload increased, thereby an operation efficiency is lowered.

Further, since display magnifications are previously set as a program or items to be set, a problem arises in that it is difficult to set the display magnifications for each operator or for each machining.

SUMMARY OF THE INVENTION

In the present invention, only a display area (display dimension) to be displayed on a screen is previously set, and which portion is to be displayed in an overall drawing region is determined according to a present machining position. Since it is not necessary to set a display area during machining, an amount of calculation for displaying a machining configuration is reduced, thereby reducing a setting workload. Since a display area displayed on the screen is not excessively changed, deterioration of a recognizing property due to an excessive change of a display magnification can be avoided.

Further, since the display area can be arbitrarily set by an operator, a display magnification desired by each operator can be easily set.

In a first aspect of a machining configuration drawing apparatus of the present invention, an overall drawing region to be drawn is previously divided into a plurality of drawing regions, and a divided drawing region is selected and displayed according to a present machining position. In a second aspect of the machining configuration drawing apparatus of the present invention, a drawing region is determined and displayed such that a predetermined position in the drawing region coincides with a present machining position at all times.

In any of the first and second aspects, when the operator simply determines a display area to be displayed on the screen, the display area is automatically moved, and the present machining position is displayed in the display area at all times.

A first aspect of the machining configuration drawing apparatus according to the present invention includes a drawing means for drawing a machining configuration and a present machining position, a display area setting means for setting a display area in an overall drawing area, a drawing region determination means for dividing the overall drawing area into a plurality of drawing regions based on the set display area, and a drawing region selection means for selecting a drawing region which is drawn by the drawing means from a plurality of drawing regions. The drawing region selection means selects a drawing region in which the present machining position exists, and the drawing means draws the machining configuration and the present machining position of the selected drawing region.

The drawing region selection means may include a determination means for determining whether or not the present machining position exists in the drawing region, and a drawing region change means for changing the drawing region determined by determination means based on a result of the determination of the determination means.

A plurality of drawing regions may have the same configuration and the same size as those of the display area set by the display area setting means. Further, the display area setting means may set a rectangular display area, and the drawing region determination means may determine a plurality of drawing regions by dividing the overall drawing area to lattice-shaped areas using the rectangular display area as a unit.

A first aspect of the machining configuration drawing method of the present invention includes a step of setting a display area in an overall drawing area, a step of dividing the overall drawing area into a plurality of display areas based on the set display area, a step of selecting a drawing region, in which the present machining position exists, from a plurality of drawing regions, and a step of drawing a machining configuration and a present machining position of the selected drawing region.

The step of selecting the drawing region may include a step of determining whether or not the present machining position exists in the drawing region, and a step of changing the drawing region based on a result of the determination.

A second aspect of the machining configuration drawing apparatus according to the present invention includes a drawing means for drawing a machining configuration and a present machining position, a display area setting means for setting a display area in an overall drawing area, a drawing region creation means for creating a drawing region drawn by the drawing means in the overall drawing area, and a position monitor means for monitoring a positional displacement between a predetermined position and the present machining position in the drawing region. The drawing region creation means creates a drawing region in which the present machining position coincides with the predetermined position based on a result of the monitoring of the position monitor means. The drawing means draws the machining configuration and the present machining position of the created drawing region.

Although the predetermined position in the drawing region may be set to any position, the present machining position may be displayed at the center of the display area by setting the predetermined position to the center of the drawing region.

A second aspect of the machining configuration drawing method of the present invention includes a step of setting a display area in an overall drawing area, a step of creating a drawing region in the overall drawing area, a step of monitoring the positional displacement between a predetermined position and a present machining position in the drawing region, a step of creating a drawing region in which the present machining position coincides with the predetermined position, based on a result of the monitoring, and a step of drawing a machining configuration and a present machining position of the created drawing region.

Further, the machining configuration drawing apparatus according to the present invention may be used as an apparatus for drawing a machining configuration machined by a wire electric discharge machine by being assembled therein. In this case, the drawing means included in the machining configuration drawing apparatus may draw the machining configuration machined by the wire electric discharge machine and the present position of a wire electrode, which is the present machining position.

According to the present invention, when the machining configuration of the wire electric discharge machine is drawn, the arithmetic operation, which is otherwise necessary to calculate a display magnification and to set a drawing region based on the calculated display magnification, can be made unnecessary by previously setting the size of the display area, thereby the processing amount of the arithmetic operation and a setting workload can be reduced.

Since the drawing region is determined using the size of the previously set display area, the display magnification is made definite. Accordingly, the display magnification can be prevented from being excessively changed, thereby a present machining position can be easily confirmed on a screen.

Further, since the display area can be arbitrarily set by an operator, the display magnification can be easily set for each operator and for each machining.

BRIEF DESCRIPTION OF THE DRAWINGS

The above and other objects and the features of the present invention will be apparent from the explanation of the following embodiments with reference to accompanying drawings, in which.

DESCRIPTION OF THE EMBODIMENTS

Figure 1:
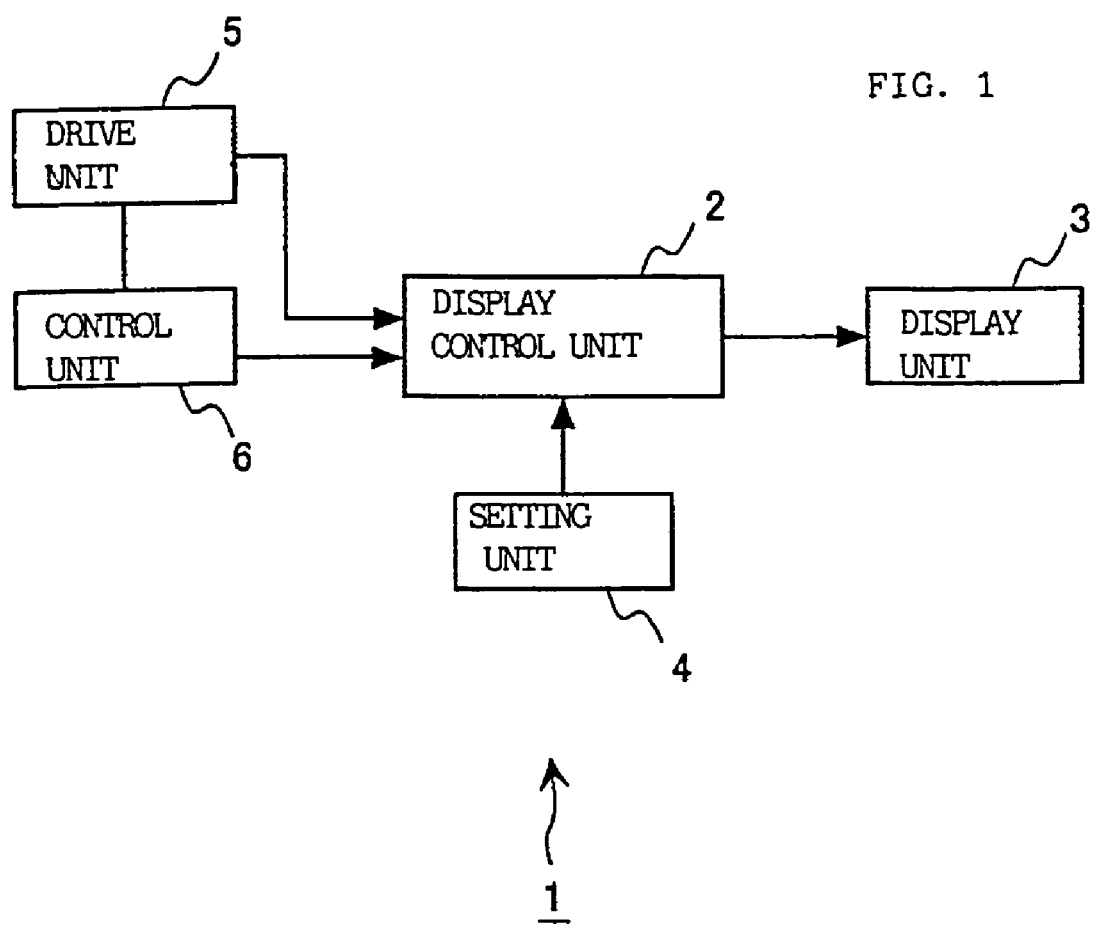
FIG. 1 is a block diagram explaining the schematic arrangement of a machining configuration drawing apparatus of the present invention.

FIG. 1 is a block diagram explaining the schematic arrangement of a machining configuration drawing apparatus of the present invention. In FIG. 1, a machining configuration drawing apparatus 1 includes a display unit 3 for drawing and displaying a machining configuration, a display control unit 2 for executing display control in order to display information relating to displayed contents on the display unit 3, and a setting unit 4 for setting a display area and the like.

When the machining configuration drawing apparatus 1 is applied to a wire electric discharge machine, the display control unit 2 obtains the position information of a present position to be machined by the wire electric discharge machine from a drive unit 5 thereof as well as obtains the configuration information of a machining configuration from a control unit thereof. The display control unit 2 displays the thus obtained present machining position and machining configuration on the display unit 3. At the time, the display control unit 2 determines a drawing region on a screen so that the present machining position is displayed in the display area set by the setting unit 4, the machining configuration and the present machining position are displayed in the drawing region.

Although the example, in which the machining configuration and the present machining position of the wire electric discharge machine are displayed, is explained here, the machining configuration drawing apparatus of the present invention can be also applied to various apparatuses such as machining apparatuses other than the wire electric discharge machine, drive apparatuses, and the like which are controlled by an NC control unit.

First Embodiment

A first embodiment of the machining configuration drawing apparatus of the present invention will be explained below with reference to FIGS. 2 to 8. According to the first embodiment, an overall drawing region is previously divided into a plurality of drawing regions, and a divided drawing region is selected according to a present machining position and displayed.

Figure 2:
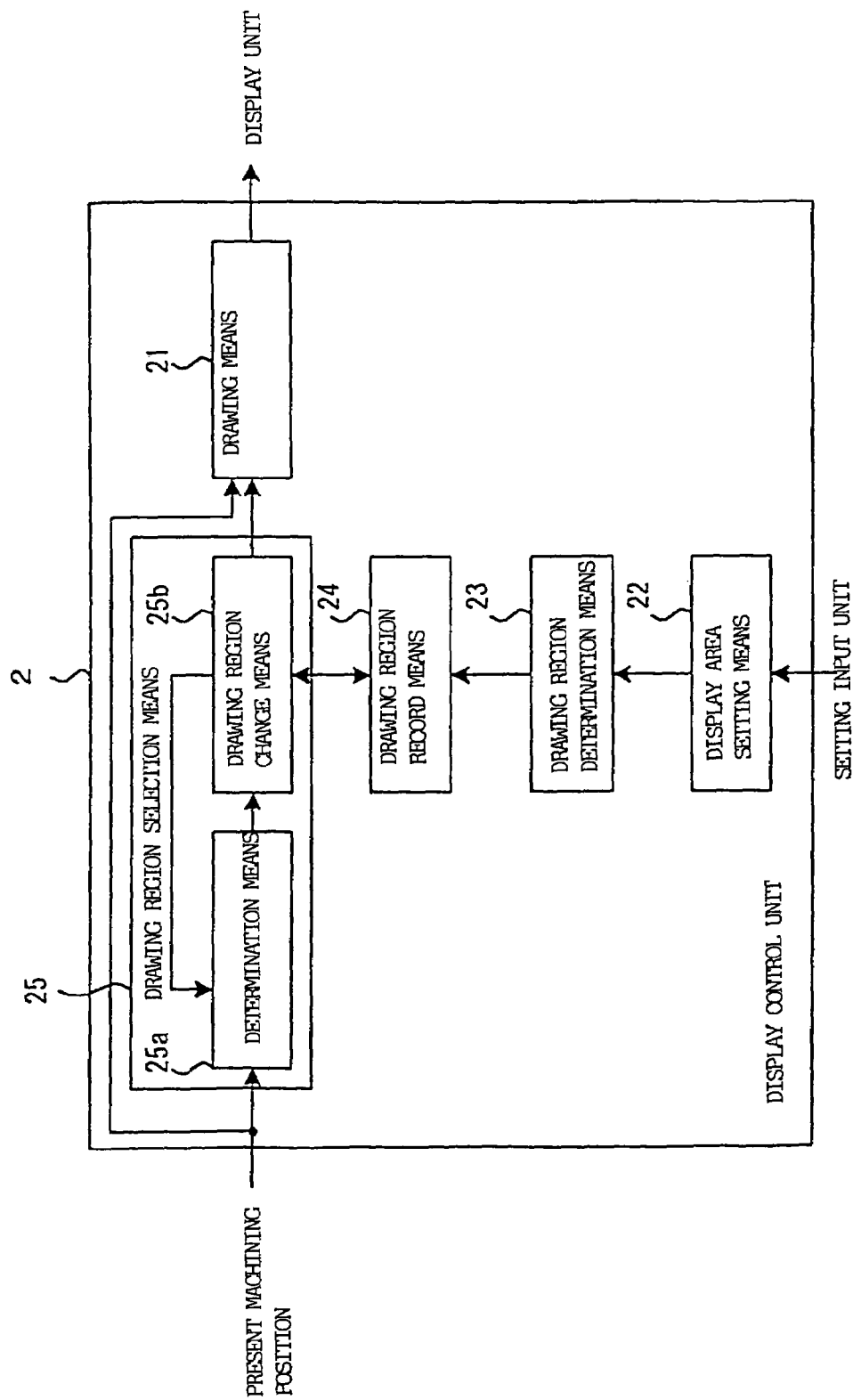
FIG. 2 is a block diagram of a display control unit of the machining configuration drawing apparatus according to a first embodiment of the present invention.

FIG. 2 shows an example of a display control unit 2 of the machining configuration drawing apparatus of the first embodiment. In FIG. 2, the display control unit 2 includes a drawing means 21, a display area setting means 22, a drawing region determination means 23, a drawing region record means 24, and a drawing region selection means 25. The drawing means 21 draws a machining configuration and a present machining position and causes a display unit 3 to display them thereon, the display area setting means 22 sets a display area in an overall drawing area, the drawing region determination means 23 divides the overall drawing area into a plurality of drawing regions based on the display area set by the display area setting means 22, the drawing region record means 24 records the drawing regions determined by the drawing region determination means 23, and the drawing region selection means 25 selects a drawing region in which drawing is executed by the drawing means 21 from a plurality of drawing regions.

The relation among the overall drawing region, the drawing region, and the display area will be explained with reference to FIGS. 3A and 3B.

Figure 3A:
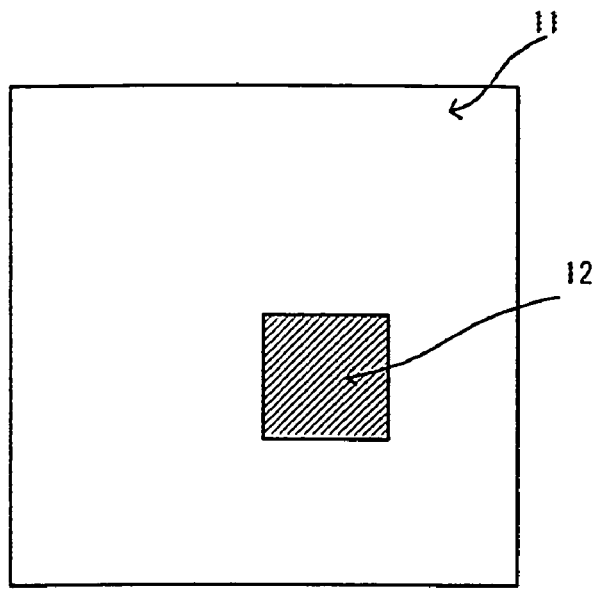
FIGS. 3A and 3B are views explaining the relation among an overall drawing region, a drawing region, and a display area shown by the machining configuration drawing apparatus of the first embodiment.
Figure 3B:
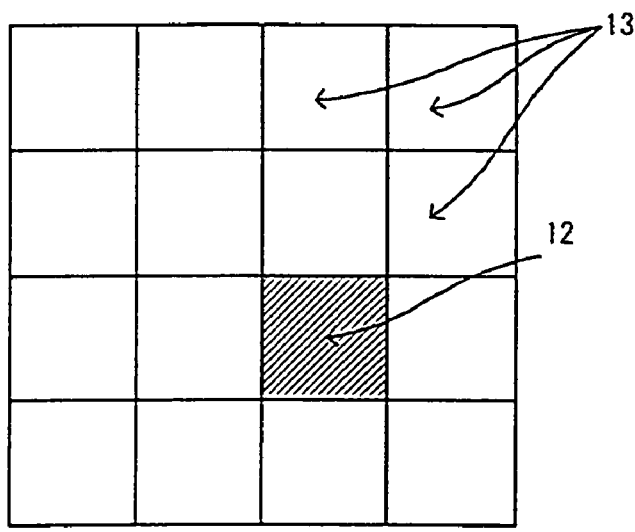

In FIG. 3A, the overall drawing region 11 is the overall area of a machining configuration displayed on a screen of the display unit 3, and a display area previously set from the overall drawing region 11 is displayed on the screen. The display area determines an area to be displayed in the overall drawing area and is determined by a configuration and a size. The display area is formed in a rectangular configuration here. Further, the size of the display area is defined by a display magnification.

A shaded portion in FIG. 3A shows the display area 12. An area having a size determined by the display area 12 is displayed on the screen of the display unit 3. The display area 12 is set by the display range setting means 22 based on the contents set by an external setting input unit. When the display area setting means 22 sets the display area 12 to a large size, a display magnification is reduced, although the area displayed on the overall screen of the display unit 3 is increased. In contrast, when the display area 12 is set to a small size, the display magnification is increased, although the area displayed on the overall screen of the display unit 3 is small.

The display area 12 set by the display area setting means 22 determines a size and a display configuration to the overall drawing region 11, and a drawing region displayed on the screen moves according to the present machining position.

The overall drawing region 11 is divided into a plurality of the drawing regions 13 based on the display area 12 set at the beginning. FIG. 3B shows the divided drawing regions 13. The drawing region 13, in which the present machining position exists, is selected by the drawing region selection means 25 from the drawing regions 13 which are determined by the drawing region determination means 23 and recorded to the drawing region record means 24. An image, in which the present machining position is incorporated, is drawn in the selected drawing region 13 by the drawing means 21. The drawn image is displayed on the display unit 3.

The drawing region determination means 23 creates a plurality of drawing regions 13 by dividing the overall drawing region 11 based on the position of the display area 12, which is set by the display area setting means 22, with respect to the overall drawing region 11 and on the configuration and the size of the display area 12. In FIG. 3B, all the drawing regions 13 are shown by the same size. However, the drawing regions 13 along the edge portions of the overall drawing region 11 do not always have the same size as the other drawing regions, depending on the position of the display area 12, which is set by the display area setting means 22 at the beginning, with respect to the overall drawing region 11. In this case, the drawing regions 13 along the edge portions are smaller than the set display area 12.

The drawing region selection means 25 includes a determination means 25a and a drawing region change means 25b. The determination means 25a determines whether or not the present machining position exists in a drawing region, and the drawing region change means 25b changes the drawing region determined by the determination means 25a based on a result of determination of the determination means 25a.

The determination means 25a obtains the present machining position from an NC machine and the like as well as obtains the drawing region used at present from the drawing region change means 25b and determines whether or not the present machining position exists in the drawing region. The drawing region change means 25b receives the result of determination made by the determination means 25a, and when the present machining position exists in the present drawing region, the drawing region used for display at present is continuously used. In contrast, when the present machining position does not exist in the present drawing region, another drawing region is selected from the drawing region record means 24 and sent to the determination means 25a, and it is determined whether or not the present machining position is included in the selected drawing region. The drawing region change means 25b extracts the drawing region in which the present machining position exists by repeating the above processing for each selected drawing region, sends the information of the extracted drawing region to the drawing means 21, and displays it on the screen of the display unit 3 together with the present machining position.

Processing executed by the machining configuration drawing apparatus of the first embodiment will be explained below using a flowchart of FIG. 7.

Figure 4A:
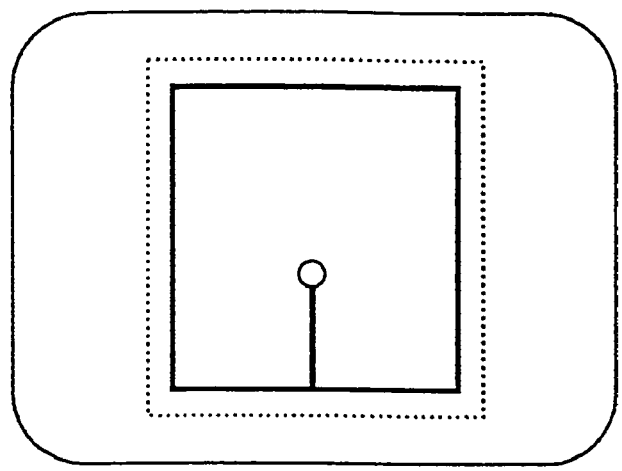
FIGS. 4A to 4C show screens on which a machining configuration and a set display area are displayed in the machining configuration drawing apparatus of the first embodiment.

First, the machining configuration is drawn on the screen (step S1). The machining configuration can be drawn by displaying the overall drawing region 11, in which the machining configuration is included, on the screen. FIG. 4A shows the screen on which the machining configuration is displayed. In the example shown in FIG. 4, the machining configuration is shown by a machining path of a wire electric discharge machine. Since the overall machining configuration is displayed on the screen, the display magnification is set to a small value. Note that when the display magnification is set by a scale value, the scale value is set to a large value. In FIG. 4A, the display area can be arbitrarily set as long as it is within a maximum display area that can be displayed on the screen.

Figure 4B:
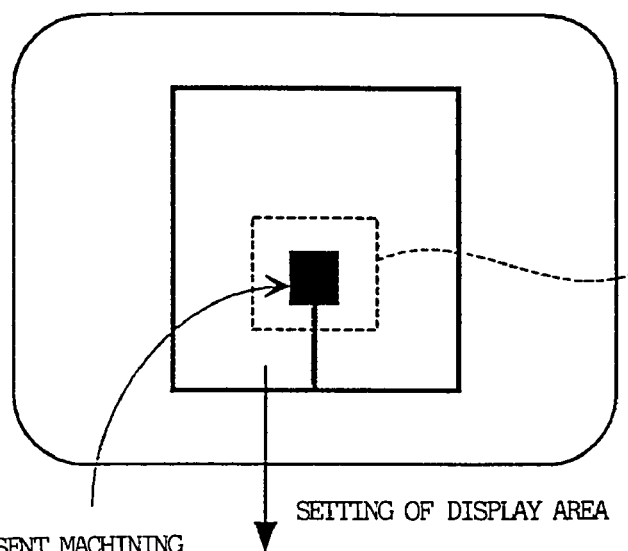
Figure 4C:
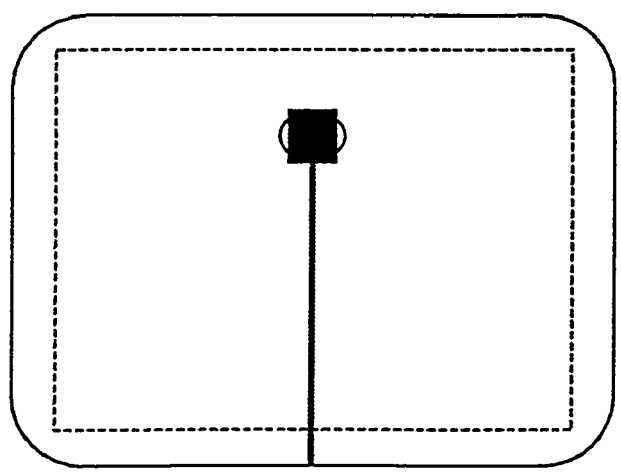

The display area is set by a user through the external setting input unit (step S2). Any input means can be used as the external setting input unit. FIG. 4B shows that the region shown by a broken line is set as the display area. FIG. 4C shows that the set display area is displayed on the overall screen. The machining configuration including the present machining position (shown by "■" in the figure) is displayed in enlargement by displaying the display area on the overall screen.

The display area may be automatically set based on the present machining position, instead of being set manually by an operator. In the case where the display area is set based on the present machining position, an area, which has predetermined lengths (for example, 10 mm) from, for example, the present machining position up, down, right, and left, is set. The predetermined lengths for determining the display area can be arbitrarily designated to different values, instead of the same value.

Figure 5B:
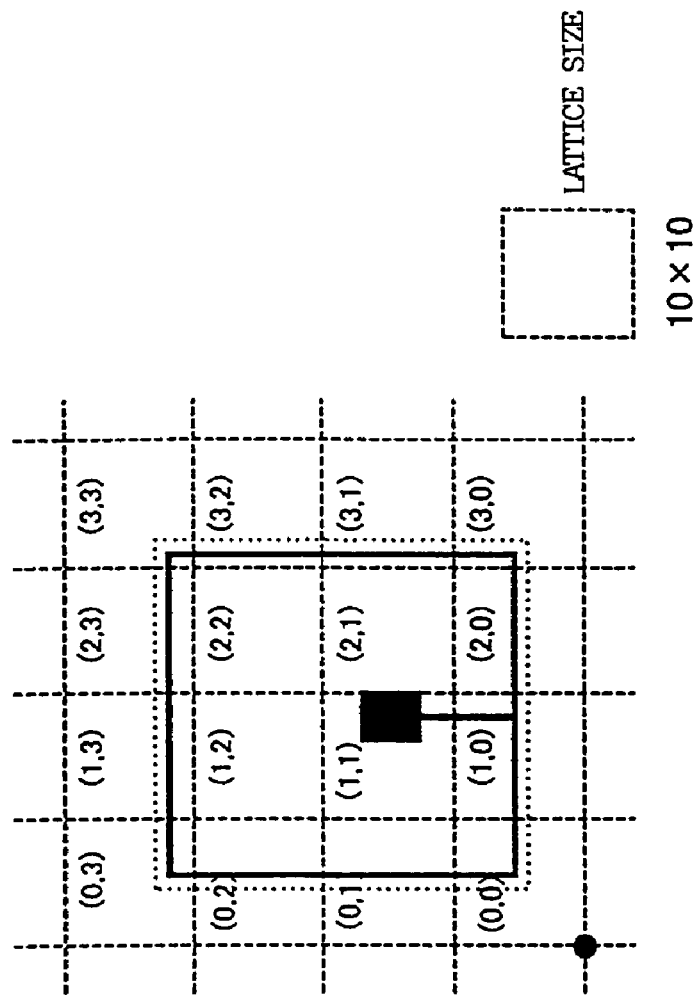
FIGS. 5A and 5B are views explaining an aspect in which the overall drawing region is divided into a plurality of drawing regions (lattices) and lattice numbers are sequentially given to the drawing regions in the machining configuration drawing apparatus of the first embodiment.
Figure 5A:
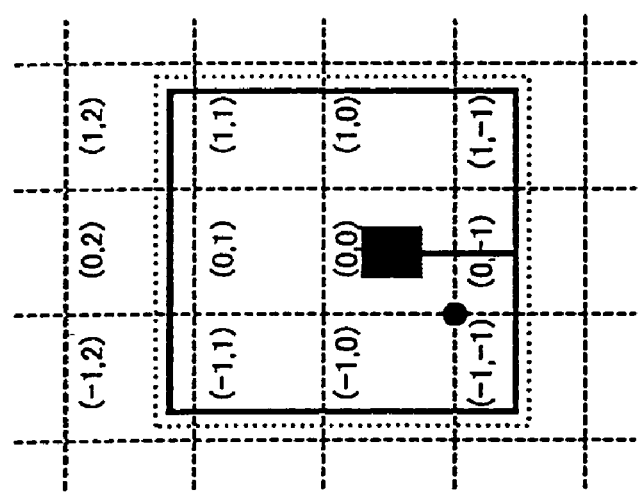

Next, the display area is determined by dividing the overall drawing region 11 (step S3). FIGS. 5A and 5B show an example of the drawing region. The divided lattice-shaped drawing regions (lattices) can be specified by lattice numbers of, for example, (0, 0), (0, −1), (−1, −1), . . . . The lattice numbers are sequentially given to the respective drawing regions using the drawing region in which a machining start point exists, as a reference position (0, 0), as shown in FIG. 5A, or using an arbitrary drawing region as the reference position (0, 0), as shown in FIG. 5B.

The drawing region divided from the overall drawing region 11 may be set to the same size as the display area set at step S2 or may be set to a size larger than that so as to form an overlapped portion between adjacent drawing regions.

When machining proceeds, the present machining position also sequentially moves, and thus the present machining position may run off the drawing region displayed at present. To cope with the above problem, the present machining position is monitored (step S4) to determine whether or not the present machining position runs off the present drawing region and moves to an adjacent drawing region (step S5).

Figure 6A:
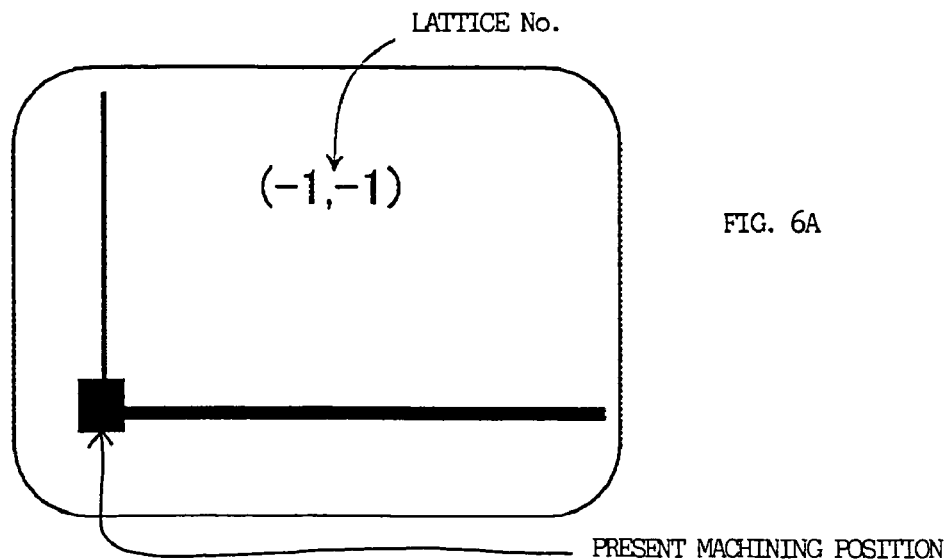
FIGS. 6A to 6C are views explaining how the drawing region is changed (or is moved to a drawing region having other lattice number) based on the movement of a present machining position in the machining configuration drawing apparatus of the first embodiment.
Figure 6B:
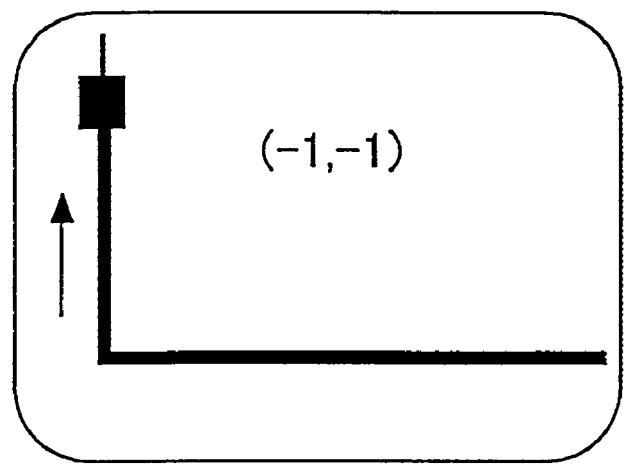
Figure 6C:
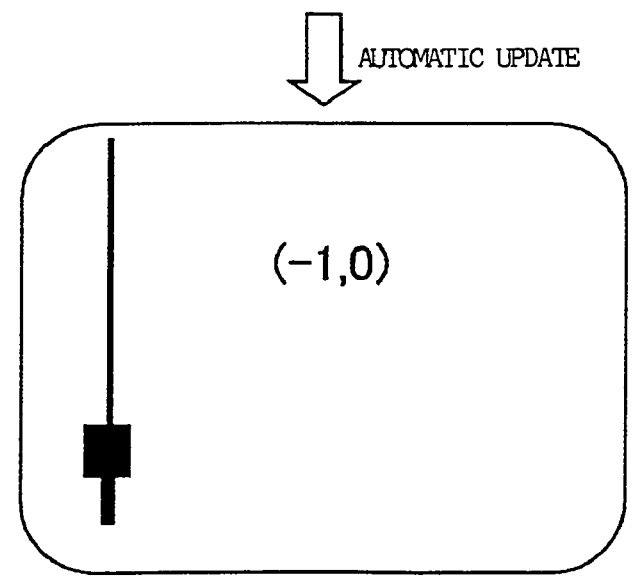

FIGS. 6A to 6C are views explaining how a drawing region is changed according to the movement of the present machining position. In these figures, the present machining position is shown by "■".

FIG. 6A shows an example in which X=−12.5 mm, Y=−10 mm. The length of one side of the respective lattices forming the drawing regions is set to 10 mm. At the time, the drawing region in which the present machining position exists, is shown by (−1, −1). When the present machining position travels along a machining path, it moves in the drawing region (−1, −1) as shown in FIG. 6B. When the machining further proceeds, the present machining position travels in a Y-direction, runs off the drawing region (−1, −1) and moves into an adjacent drawing region (−1, 0).

When the present machining position moves into a new drawing region (step S5: determination "No"), to which drawing region the previous drawing region is to be changed is determined by the processing executed at steps S6 to S9, and a new drawing region to be displayed is determined by the processing executed at step S10.

FIG. 6C shows an example in which the present machining position is displayed in the changed drawing region (−1, 0).

In the determination of the drawing region executed at steps S6 to S9, it is determined whether the present machining position moves in a −X-direction or a +X-direction, or does not move in the X-direction. When the present machining position moves in the −X-direction, the value of X is decremented by 1 (X=X−1), and the process proceeds to step S7, when it moves in the +X-direction, the value of X is incremented by 1 (X=X+1), and the process proceeds to step S9, and when it does not move in the X-direction, the process proceeds to step S8 remaining the value of X as it is (X=X).

At next steps S7, S8, or S9, it is determined whether the present machining position moves in a −Y-direction or a +Y-direction, or does not move in the Y-direction. When the present machining position moves in the −Y-direction, the value of Y is decremented by 1 (Y=Y−1), and the process proceeds to step S10, when it moves in the +Y-direction, the value of Y is incremented by 1 (Y=Y+1), and the process proceeds to step S10, and when it does not move in the Y-direction, the process proceeds to step S10 remaining the value of Y as it is (Y=Y).

In the processing executed at step S10, a drawing region having an updated lattice number (X, Y) is displayed. Then, the process returns to step S4.

Figure 7:
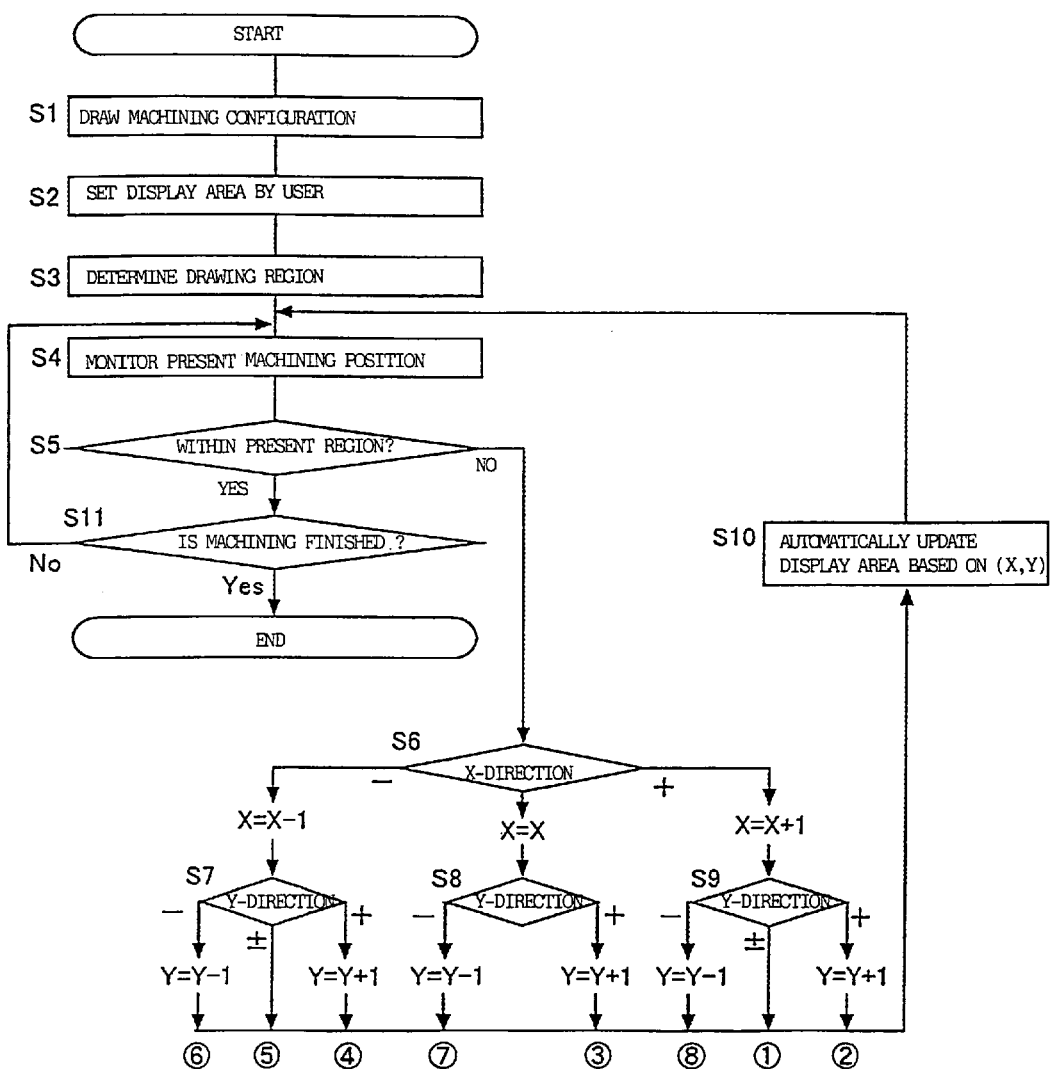
FIG. 7 is a flowchart explaining a processing operation of the machining configuration drawing apparatus of the first embodiment.
Figure 8:
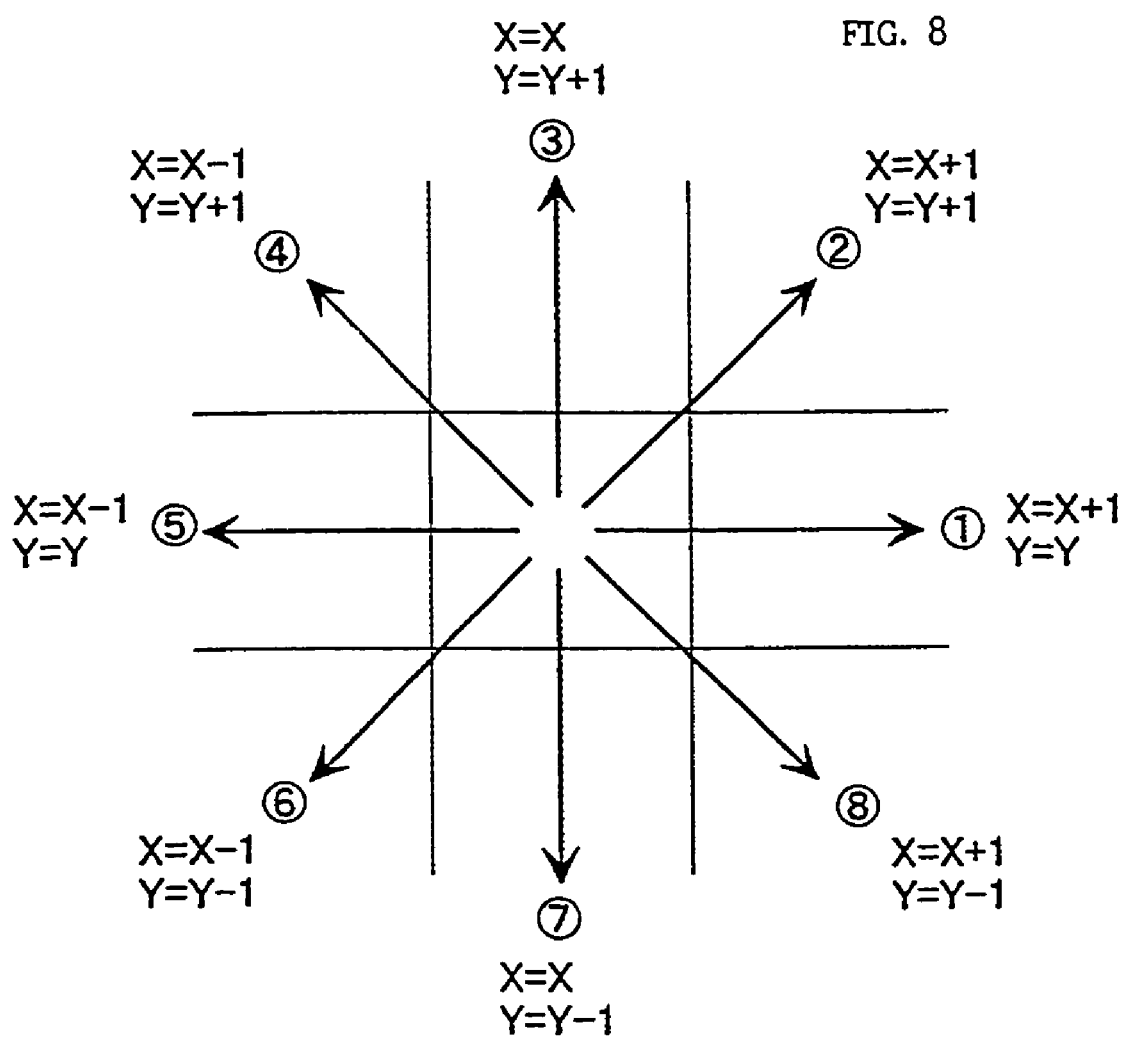
FIG. 8 is a view showing moving directions to new drawing regions based on a result of determination of the drawing region shown in the flowchart of FIG. 7.

Numbers are given to the results of determinations at steps S7, S8, and S9 in FIG. 7 so that the numbers correspond to the moving directions of the numbers shown in FIG. 8.

Second Embodiment

A second embodiment of the machining configuration drawing apparatus of the present invention will be explained below with reference to FIGS. 9 to 13. According to the second embodiment, a drawing region is determined and displayed such that a predetermined position (central position) in the drawing region coincides with a present position at all times.

Figure 9:
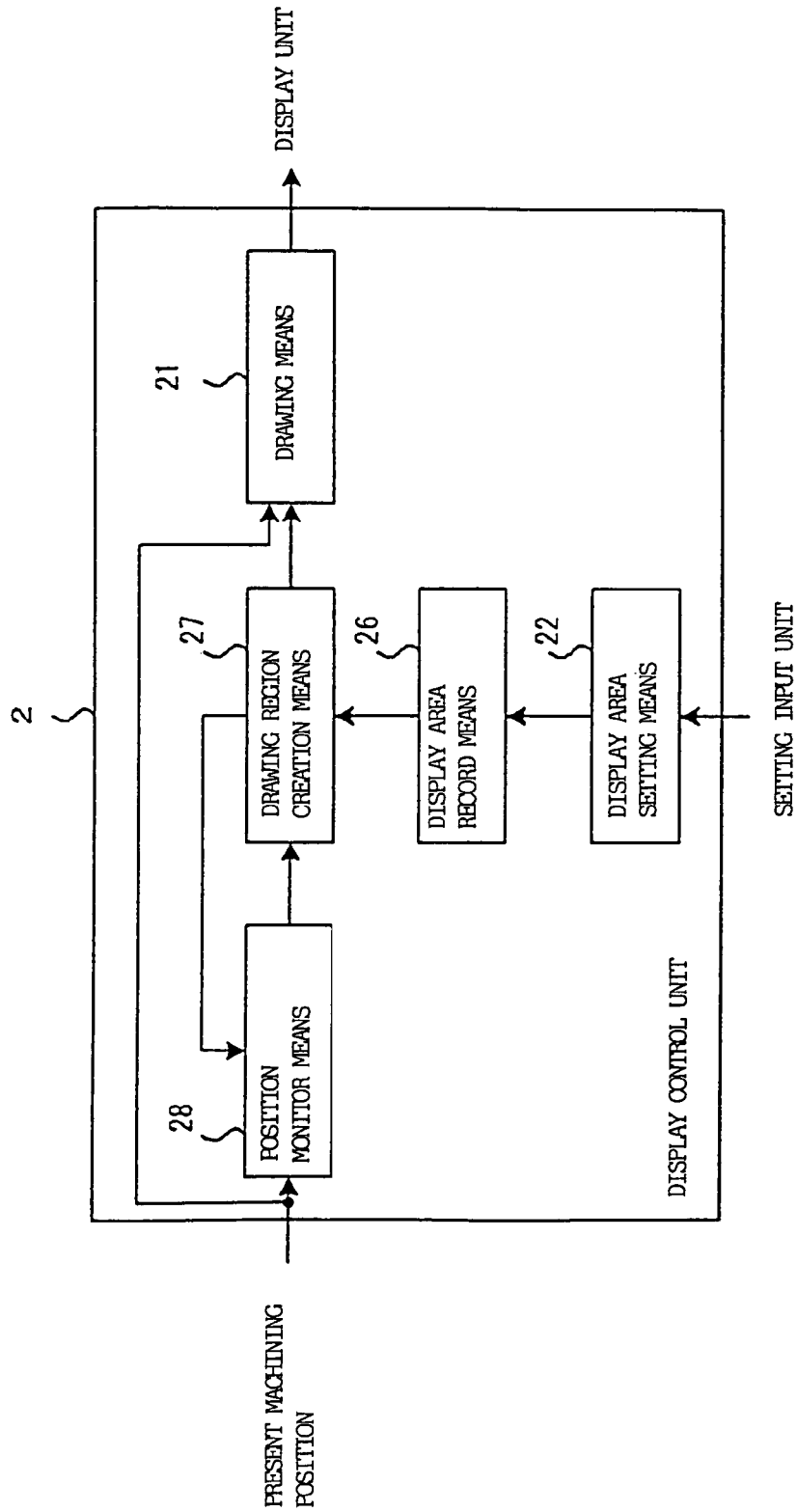
FIG. 9 is a block diagram of a display control unit of a machining configuration drawing apparatus according to a second embodiment of the present invention.

FIG. 9 is an example of a display control unit 2 included in the machining configuration drawing apparatus of the embodiment. In FIG. 9, the display control unit 2 includes a drawing means 21, a display area setting means 22, a drawing region creation means 27, and a position monitor means 28. The drawing means 21 draws a machining configuration and a present machining position, the display area setting means 22 sets a display area in an overall drawing area, the drawing region creation means 27 creates a drawing region drawn by the drawing means 21 in the overall drawing area, and the position monitor means 28 monitors the positional dislocation between a predetermined position and the present machining position in the drawing region.

The drawing region creation means 27 creates the drawing region in which the present machining position coincides with the predetermined position in the drawing region, based on a result of monitoring executed by the position monitor means 28. The drawing means 21 draws the machining configuration and the present machining position of the drawing region created by the drawing region creation means 27.

Figure 10A:
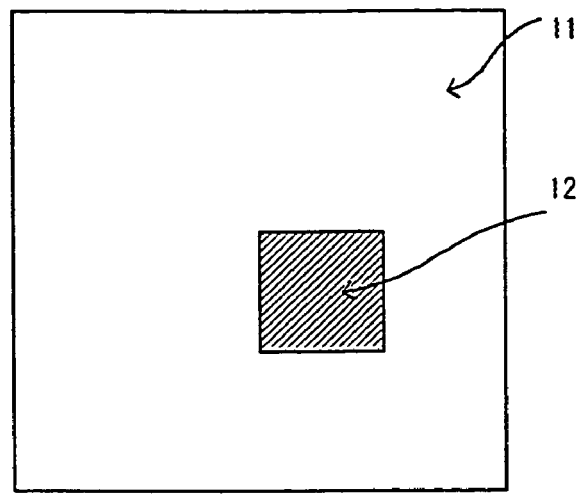
FIGS. 10A to 10C are views explaining the relation among an overall drawing region, a drawing region, and a display area displayed by the machining configuration drawing apparatus of the second embodiment.
Figure 10B:
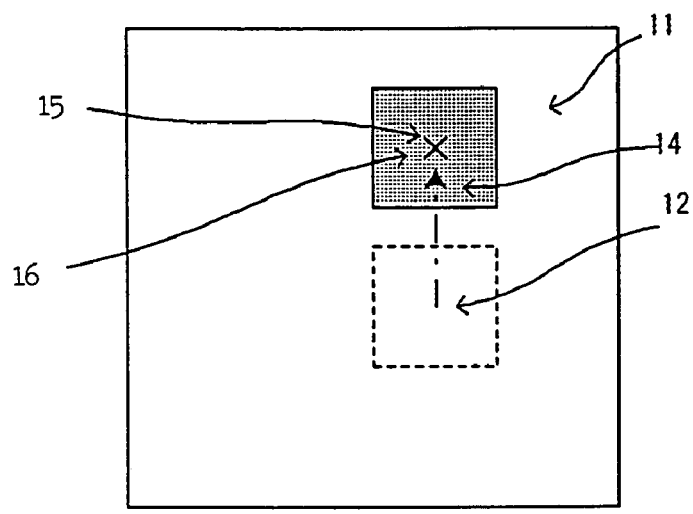
Figure 10C:
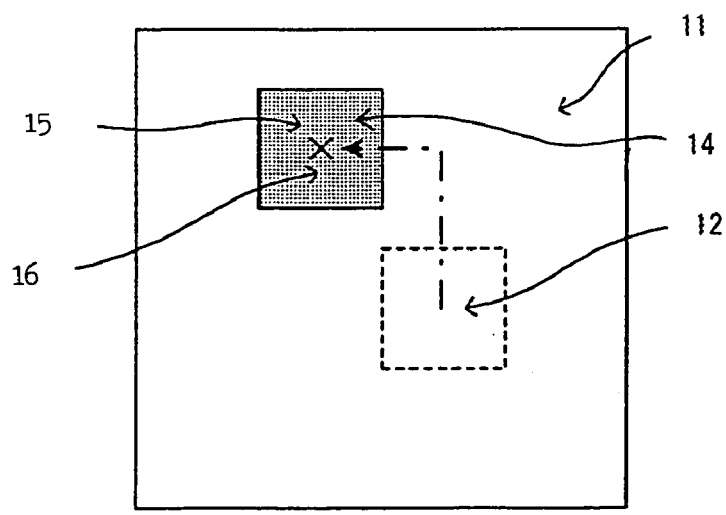

FIGS. 10A to 10C are views explaining the relation among an overall drawing region, a drawing region, and a display area.

In FIG. 10A, the overall drawing region 11 corresponds to the overall area displayed on a screen of a display unit 3. A previously set display area is displayed on the screen from the overall drawing region 11. The display area determines an area to be displayed in the overall drawing region 11 and is determined by a configuration and a size. The display area is formed in a rectangular configuration here. Further, the size of the display area is defined by a display magnification.

A shaded portion in FIG. 10A shows the display area 12. An area having a size determined by the display area 12 is displayed on the screen of the display unit 3. The display area 12 is set by the display range setting means 22 based on the contents set by an external setting input unit.

Accordingly, when the display area setting means 22 sets the display area 12 to a large size, a display magnification is reduced, although the area displayed on the overall screen is increased. In contrast, when the display area 12 is set to a small size, the display magnification is increased, although the area displayed on the overall screen is small.

The display area 12 set by the display area setting means 22 determines a size and a display configuration with respect to the overall drawing region 11, and a drawing region displayed on the screen moves according to the present machining position.

In the second embodiment, the present machining position is caused to exist in the drawing region 14 at all times by making the size of the display area 12 set at the beginning as large as that of the drawing region 14 and moving also the drawing region 14 according to the movement of the present machining position.

FIGS. 10B and 10C show the state in which the drawing region 14 is updated according to the movement of the present machining position. The position monitor means 28 monitors the present machining position and the predetermined position in the drawing region 14. The drawing region creation means 27 sequentially creates the drawing regions 14 so that the present machining position is displayed at the predetermined position in the drawing region 14 even if the present machining position moves, draws an image in which the present machining position is incorporated in the drawing region 14 selected by the drawing means 21, and displays the image on the display unit 3.

The drawing region creation means 27 creates the drawing region 14 based on the position of the drawing region 14, which is monitored by the position monitor means 28, with respect to the overall drawing region 11 and on the configuration and the size of the display area 12.

FIGS. 10B and 10C show the movement of drawing region 14 according to the movement of the present machining position, and the drawing region 14 is created so that the present machining position 15 coincides with the center 16 of the drawing region 14 at all times.

The position monitor means 28 obtains the present machining position from an NC machine and the like as well as obtains the drawing region used at present from the drawing region creation means 27 and determines whether or not the present machining position exists in a predetermined position (for example, center) of the present drawing region. The drawing region creation means 27 receives a result of monitoring from the position monitor means 28, and when the present machining position is in the predetermined position of the drawing region, the drawing region creation means 27 continuously uses the drawing region used for display at present as it is. In contrast, when the present machining position runs off the predetermined position of the drawing region, the drawing region creation means 27 creates a drawing region by displacing it by the amount of positional displacement and sends the drawing region to the position monitor means 28, which determines whether or not the present machining position coincides with the predetermined position of the drawing region. The drawing region creation means 27 and the position monitor means 28 create drawing regions by repeating the above determination for each created drawing region, and send the information of the created drawing regions to the drawing means 21, which displays the drawing regions on the screen of the display unit 3 together with the present machining position.

Figure 13:
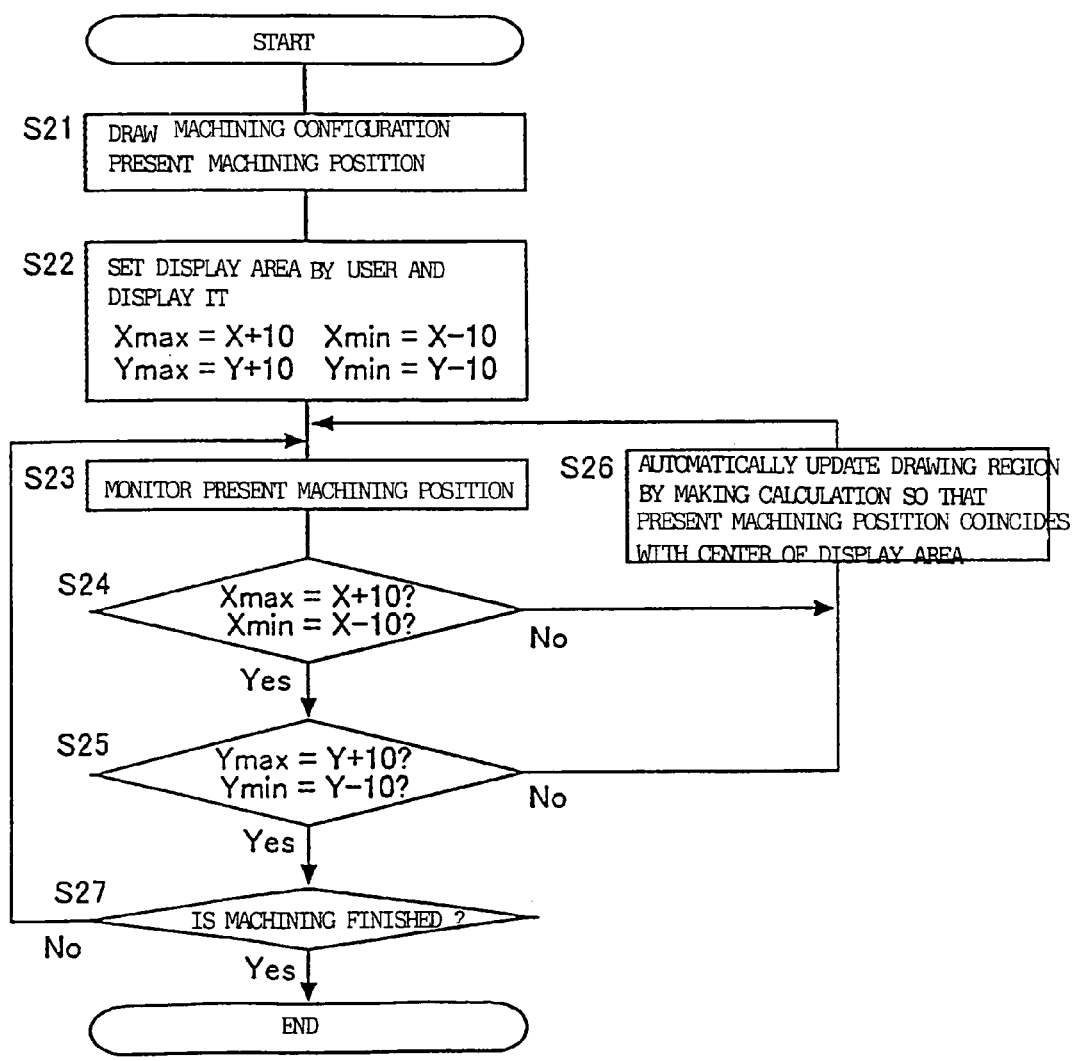
FIG. 13 is a flowchart explaining a processing operation of the machining configuration drawing apparatus of the second embodiment.

Processing executed by the machining configuration drawing apparatus of the second embodiment will be explained below using a flowchart of FIG. 13.

Figure 11A:
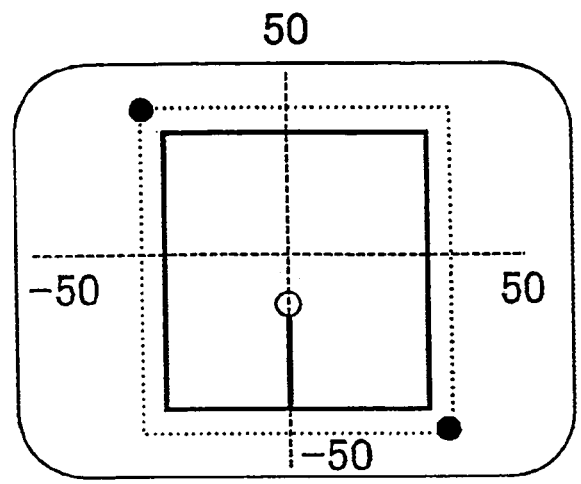
FIGS. 11A to 11C show screens on which a machining configuration and a set display area are displayed in the machining configuration drawing apparatus of the second embodiment.

First, the machining configuration and the present machining position are drawn on the screen (step S21). The machining configuration can be drawn by displaying the overall drawing region 11, in which the machining configuration is included, on the screen. FIG. 11A shows the screen on which the machining configuration is displayed. The machining configuration is shown by a machining path of a wire electric discharge machine. Since the overall machining configuration is displayed on the screen, a display magnification is set to a small value. Note that when the display magnification is set by a scale value, the scale value is set to a large value.

In FIG. 11A, a display area can be arbitrarily set as long as it is within a maximum display area that can be displayed on the screen.

Figure 11B:
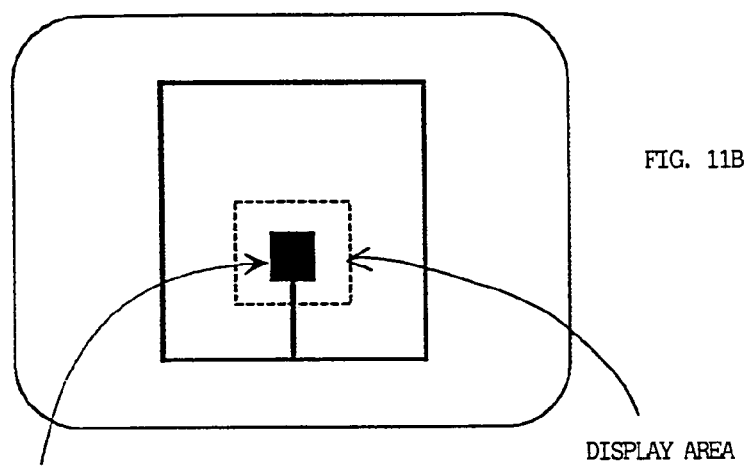
Figure 11C:
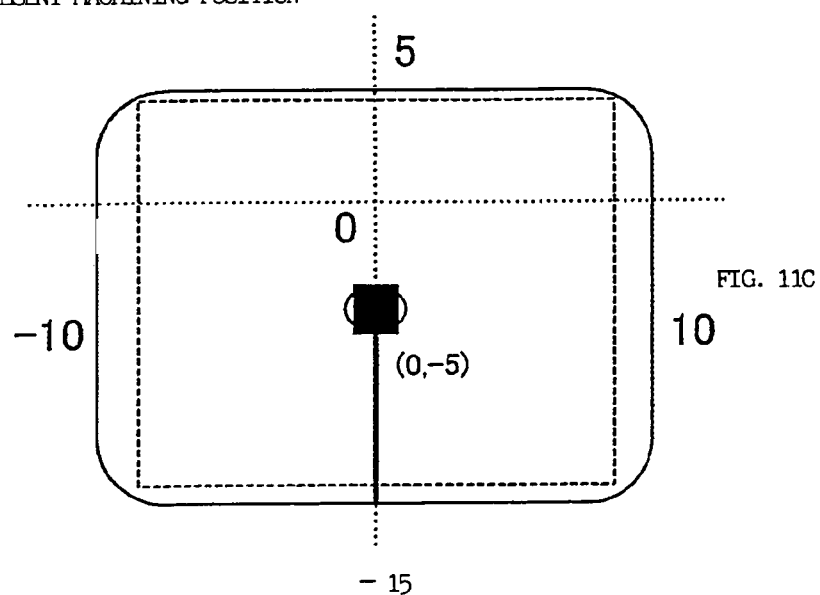

A display area is set through the external setting input unit by a user (step S22). Any input means can be used as the external setting input unit. FIG. 11B shows how the display area is set, and the set display area is shown by a broken line in the figure. FIG. 11C shows that the set display area is displayed on the overall screen as a drawing region. The machining configuration including the present machining position (shown by "■" in the figure) is displayed in enlargement by displaying the display area on the overall screen.

The drawing region is set such that the present machining position is located at a predetermined position in the drawing region. In the example, drawing region is set such that the present machining position is located at the center thereof. The display area may be automatically set based on the present machining position, instead of being set manually by an operator. When the display area is set based on the present machining position, an area, which has predetermined lengths (for example, 10 mm) from, for example, the present machining position up, down, right, and left, is set.

With this operation, the maximum value in an X-axis direction Xmax is set to Xmax=X+10, the minimum value in the X-axis direction Xmin is set to Xmin=X−10, the maximum value in a Y-axis direction Ymax is set to Ymax=Y+10, and the minimum value in the Y-axis direction Ymin is set to Ymin =Y−10.

The predetermined length for determining the display area can be arbitrarily designated to different values, instead of the same value.

When machining proceeds, since the present machining position moves, it runs off the center of the drawing region. To cope with the above problem, the present machining position is monitored (step S23), and it is determined whether or not the present machining position is displaced from the center.

The displacement of the present machining position from the center can be determined by determining the positional displacement in the X-axis direction by the processing executed at step S24 as well as determining the positional displacement in the Y-axis direction by the processing executed at step S25.

The processing at step S24 determines whether or not "X +10" obtained by adding 10 to the present machining position "X" coincides with the maximum value Xmax in the X-axis direction or whether or not "X−10" obtained by subtracting 10 from the present machining position "X" coincides with the minimum value Xmin in the X-axis direction. On the other hand, the processing at step S25 determines whether or not "Y+10" obtained by adding 10 to the present machining position "Y" coincides with the maximum value Ymax in the Y-axis direction or whether or not "Y−10" obtained by subtracting 10 from the present machining position "Y" coincides with the minimum value Ymin in the Y-axis direction.

When it is determined at steps S24 and S25 that there is the positional displacement in any of the X-axis direction and the Y-axis direction, the drawing region is automatically updated by making a calculation so that the present machining position coincides with the center of the drawing region (display area) (step S26). In contrast, when there is no positional dislocation in any of the X-axis direction and the Y-axis direction, the processing at steps S23 to S26 are repeated until the machining is finished.

Figure 12A:
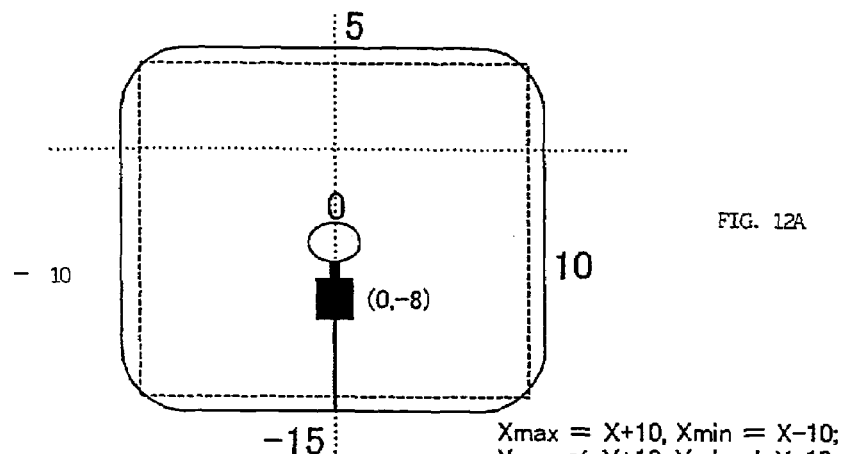
FIGS. 12A to 12C are views explaining how the drawing region is changed (present machining position is displayed coinciding with the center of the drawing region) based on the movement of a present machining position in the machining configuration drawing apparatus of the second embodiment.

FIG. 12A shows the state in which the present machining position moves from a drawing region (0, 0) to a drawing region (0, −8). In this case, although Xmax coincides with X+10 and Xmin coincides with X−10, the maximum value Ymax=5 in the Y-axis direction does not coincide with Y+10 (=−8 +10=2), and the minimum value Ymin=−15 in the Y-axis direction does not coincide with Y−10 (=−8−10=− 18).

Figure 12B:
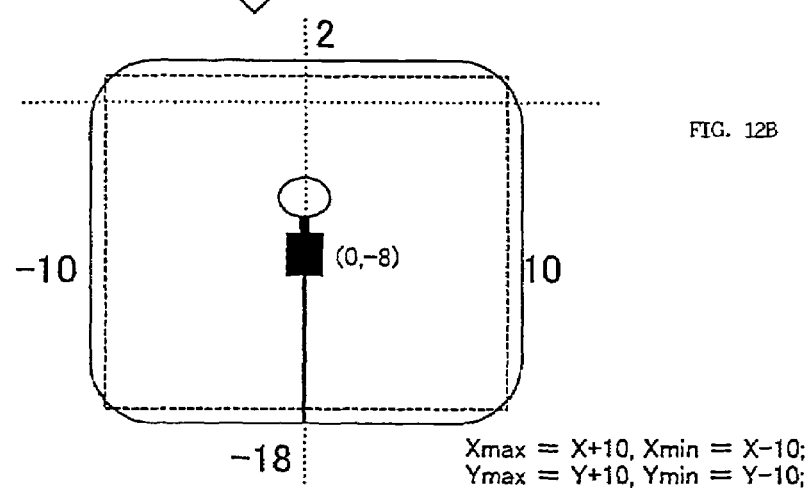

Accordingly, a drawing region, which satisfies Xmax=10, Xmin=−10, Ymax=2, and Ymin=−18, is determined by recalculating the drawing region so that the drawing region is updated as shown in FIG. 12B. The present machining position can be displayed coinciding with the center of the drawing region by updating the drawing region.

Figure 12C:
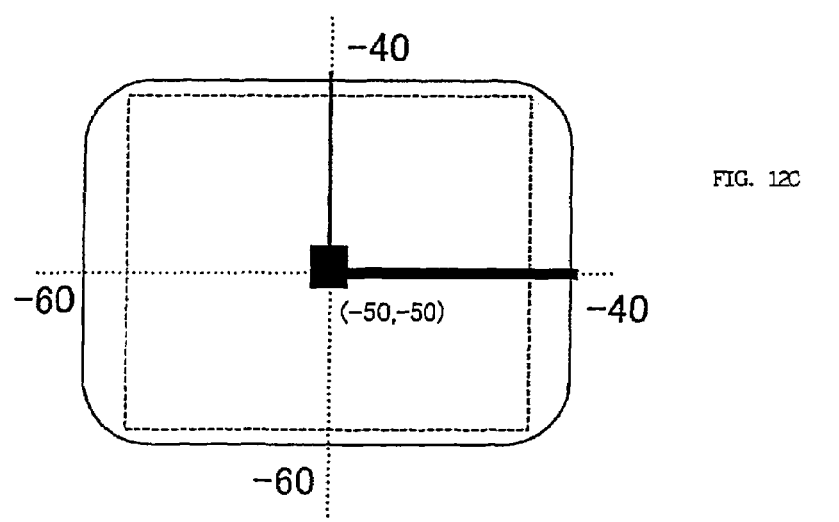

Note that FIG. 12C shows an example of display of the case in which the present machining position is located at a corner of the machining configuration depending on a machining state.

The machining configuration drawing technology according to the present invention can be applied not only to display of a machining configuration in a wire electric discharge machine but also to display of a machining configuration and a present machining position in various apparatuses such as machining apparatuses other than the wire electric discharge machine and the like which are driven by an NC machine.

What is claimed is:

1. A machining configuration drawing apparatus comprising:
    drawing means for drawing a machining configuration and a present machining position;
    display area setting means for setting a display area in an overall drawing area;
    drawing region determination means for dividing the overall drawing area into a plurality of drawing regions based on the set display area;
    drawing region selection means for selecting a drawing region which is drawn by the drawing means from a plurality of drawing regions; and
    monitoring means for monitoring the present machining position to determine whether the present machining position remains within the selected drawing region,
    wherein said drawing region selection means selects a drawing region in which the present machining position exists and selects a new drawing region to be displayed when it is determined that the present machining position does not remain within the selected drawing region, and
    said drawing means draws the machining configuration and the present machining position of the selected new drawing region.

2. The machining configuration drawing apparatus according to claim 1, wherein said drawing region selection means comprises:
    determination means for determining whether or not the present machining position exists in the drawing region; and
    drawing region change means for changing the drawing region determined by determination means based on a result of the determination of the determination means.

3. The machining configuration drawing apparatus according to claim 1, wherein a plurality of drawing regions have the same configuration and the same size as those of the display area set by the display area setting means.

4. The machining configuration drawing apparatus according to claim 1, wherein said display area setting means sets a rectangular display area; and
    said drawing region determination means determines a plurality of drawing regions by dividing the overall drawing area into lattice-shaped areas using the rectangular display area as a unit.

5. A machining configuration drawing apparatus comprising:
    drawing means for drawing a machining configuration and a present machining position;
    display area setting means for setting a display area in an overall drawing area;

drawing region creation means for creating a drawing region drawn by the drawing means in the overall drawing area; and position monitor means for monitoring a positional displacement between a predetermined position and the present machining position in the drawing region, wherein said drawing region creation means creates a drawing region in which the present machining position coincides with the predetermined position based on a result of the monitoring of the position monitor means; and the drawing means draws the machining configuration and the present machining position of the created drawing region.

6. The machining configuration drawing apparatus according to claim 5, wherein the predetermined position in the drawing region is set to the center of the drawing region.

7. The machining configuration drawing apparatus according to claim 5, wherein the machining configuration drawing apparatus is provided with a wire electric discharge machine, and the drawing means draws a machining configuration created by the wire electric discharge machine and the present position of a wire electrode as the present machining position.

8. A machining configuration drawing method comprising:

setting a display area in an overall drawing area;

dividing the overall drawing area into a plurality of display areas based on the set display area;

selecting a drawing region in which the present machining position exists, from a plurality of drawing regions;

drawing a machining configuration and a present machining position of the selected drawing region;

monitoring means for monitoring the present machining position to determine whether the present machining position remains within the selected drawing region; and selecting a new drawing region to be displayed when it is determined that the present machining position does not remain within the selected drawing region and drawing the machining configuration and the present machining position of the selected new drawing region.

9. The machining configuration drawing method according to claim 8, wherein said selecting of the drawing region comprises:

determining whether or not the present machining position exists in the drawing region; and changing the drawing region based on a result of the determination.

10. A machining configuration drawing method comprising:

setting a display area in an overall drawing area;

creating a drawing region in the overall drawing area;

monitoring the positional displacement between a predetermined position and a present machining position in the drawing region;

creating a drawing region in which the present machining position coincides with the predetermined position, based on a result of the monitoring; and drawing a machining configuration and a present machining position of the created drawing region.

11. A machining configuration drawing apparatus comprising:

drawing means for drawing a machining configuration and a present machining position;

display area setting means for setting a display area in an overall drawing area;

drawing region determination means for dividing the overall drawing area into a plurality of drawing regions based on the set display area; and drawing region selection means for selecting a drawing region which is drawn by the drawing means from a plurality of drawing regions, wherein said drawing region selection means selects a drawing region in which the present machining position exists, and said drawing means draws the machining configuration and the present machining position of the selected drawing region, wherein the machining configuration drawing apparatus is provided with a wire electric discharge machine, and the drawing means draws a machining configuration created by the wire electric discharge machine and the present position of a wire electrode as the present machining position.

* * * * *